Patented May 10, 1932

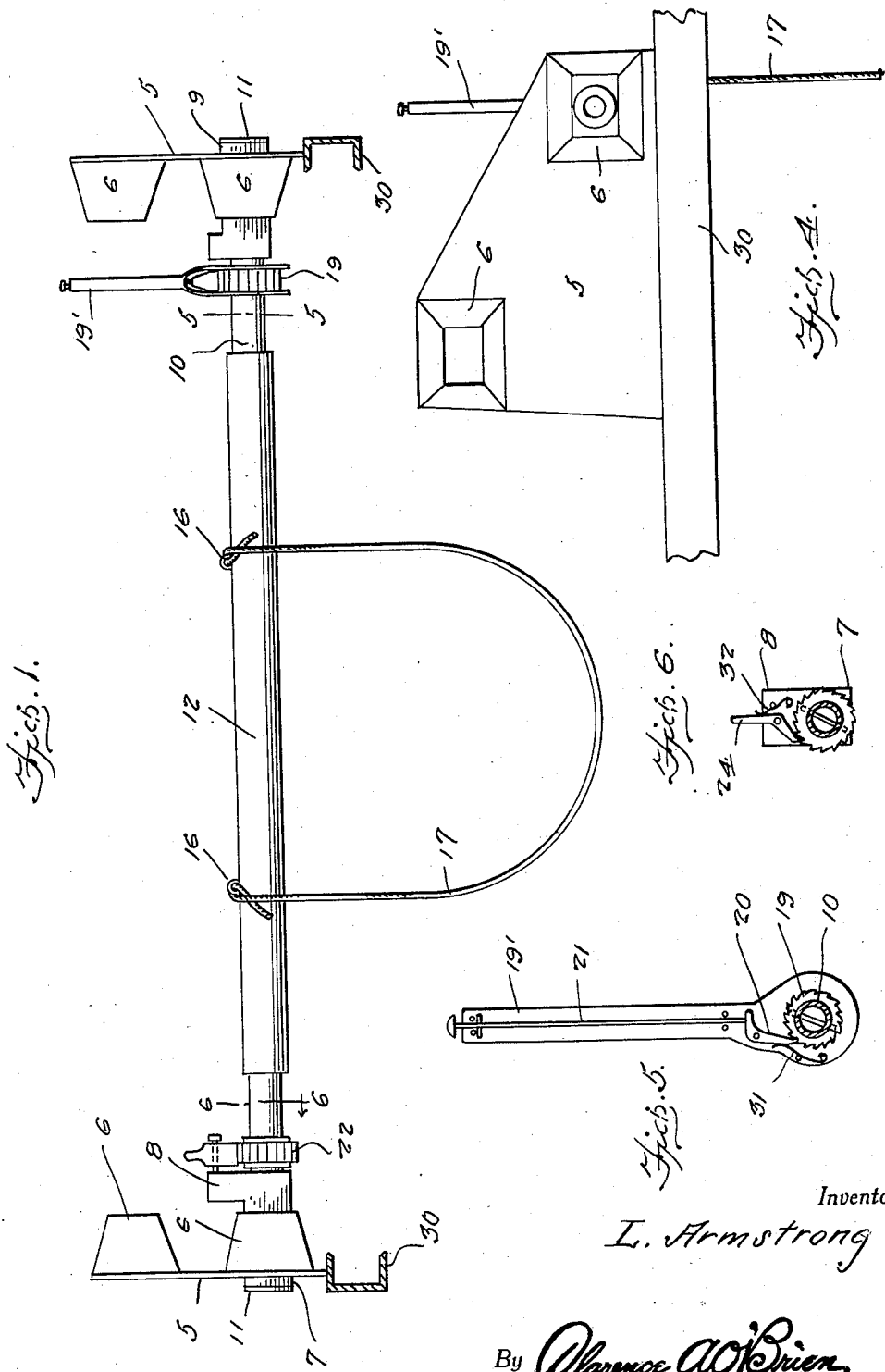

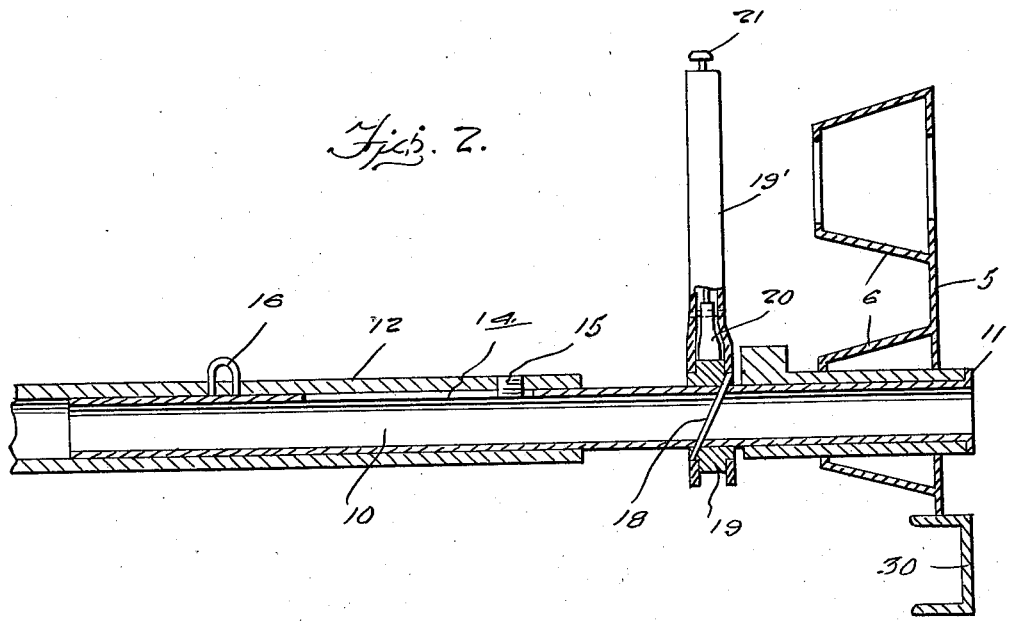
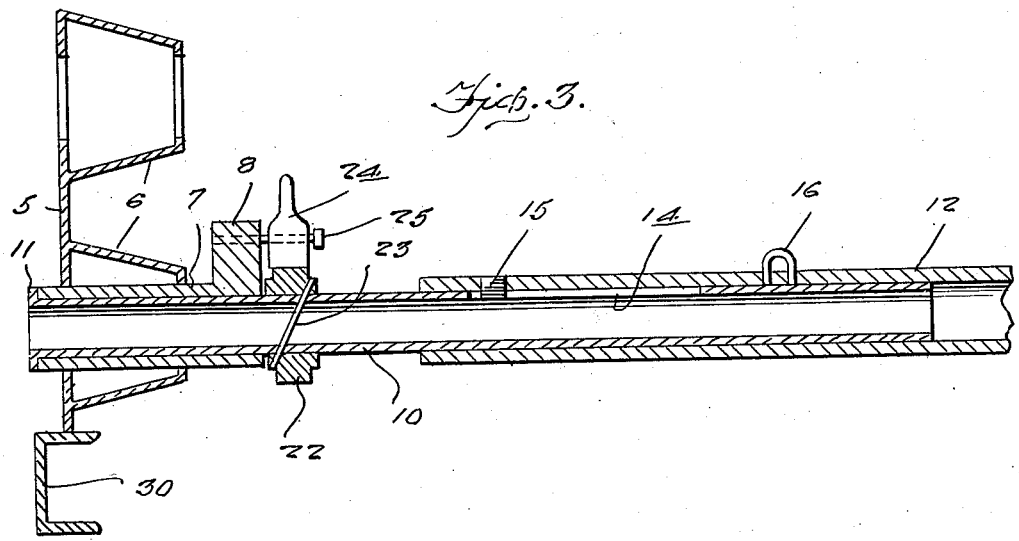

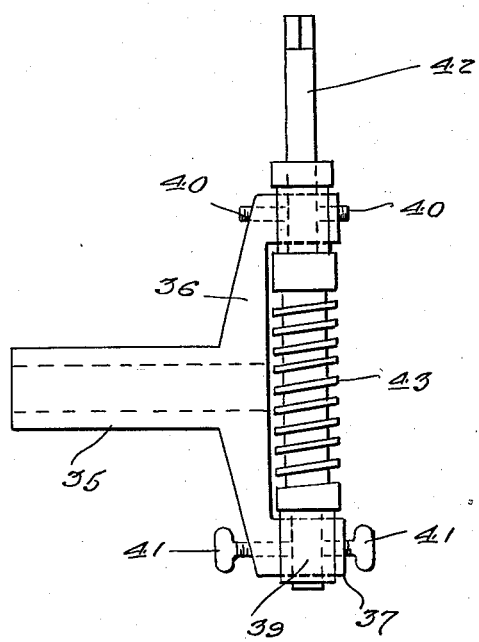
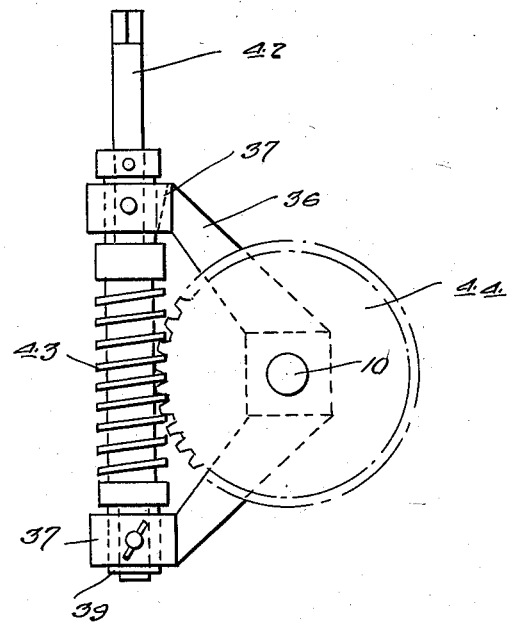
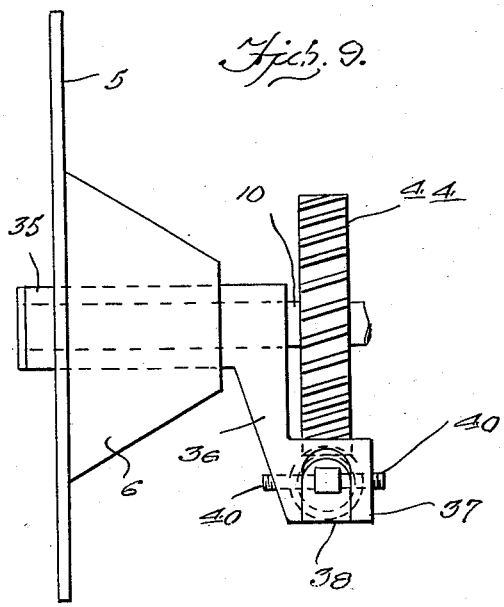
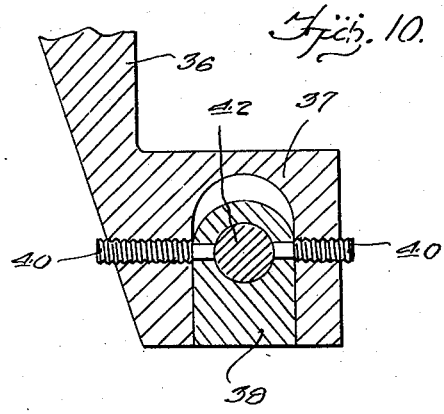

1,857,579

UNITED STATES PATENT OFFICE

LEONARD J. ARMSTRONG, OF MARINERS HARBOR, NEW YORK

AUTOMOBILE TRANSMISSION HOIST

Application filed December 27, 1928. Serial No. 328,666.

The present invention relates to an automobile transmission hoist and has for its prime object to provide a device which may be supported on the frame of an automobile so that the transmission may be hoisted or supported when certain work is being done thereon.

Another very important object of the invention resides in the provision of an automobile transmission hoist of this nature which is exceedingly simple in its construction, adjustable, easy to manipulate, strong and durable, inexpensive to manufacture, thoroughly efficient and reliable in use and operation, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:

Figure 1 is an elevation of the device embodying the features of this invention showing the same supported on the side rails of an automobile frame, said rails being shown in section, Figure 2 is a longitudinal section through one end thereof, Figure 3 is a longitudinal section through the other end thereof, Figure 4 is an end elevation thereof, Figure 5 is a sectional view taken substantially on the line 5—5 of Figure 1, Figure 6 is a sectional view taken substantially on the line 6—6 of Figure 1, Figure 7 is a detail view showing another operating mechanism, Figure 8 is a view taken at right angles to that shown in Figure 7, Figure 9 is a view showing the embodiment in place in the stand, and Figure 10 is an enlarged detail section therethrough.

Referring to the drawings in detail and first the embodiment of the invention disclosed in Figures 1 to 2 inclusive it will be seen that numerals 5 denote the stands each of which is provided with a pair of bearing receiving members 6. In one of these bearing receiving members of one stand is a bearing 7 with a pawl supporting extension rising from the inner end thereof.

In one of the bearing receiving members 6 of the other stand 5 there is a bearing 9. Tubular shafts 10 are rotatable in the bearings 7 and 9 and have collars or outwardly directed annular flanges 11 at their outer ends while their inner ends are telescoped into a hollow drum 12.

The hollow shafts 10 are provided with slots 14 and the drum is provided with screws 15 extending into the slots 14 so that the drum and shaft turn as a unit but the shafts may be moved in and out of the drum to increase or decrease the length of the mechanism. Fastening elements 16 are mounted on the drum so that the ends of a cable 17 may be engaged therwith.

On one shaft 10 there is fixed by means of a pin 18 a ratchet wheel 19 about which is rotatable a lever 19' having a pawl 20 engageable with the ratchet wheel 19 and operable by a rod 21 extended through the lever 19'.

A ratchet wheel 22 is mounted on the other shaft 10 by means of pin 23 and a pawl 24 is pivoted by a pin 25 to the support extension 8 of the bearing 7 to engage with the ratchet wheel 22.

From the above detailed description it will be seen that the mechanism or apparatus may be extended so that the stands 5 rest on the side rails 30 of an automobile frame with the cable 17 extending under the transmission thereof. Then by rocking the lever 19' the shaft 10 and drum may be turned to wind the cable on the drum for hoisting or supporting the transmission and the cable is prevented from unwinding because of the pawl 24 engaging the ratchet wheel 22. Obviously the pawl 24 may be swung out of engagement with the ratchet wheel 22 so as to permit the lowering of the transmission or the disengagement of the cable 17 therefrom. The pawls 20 and 24 are spring pressed as is shown to advantage respectively at 31 in Figure 5 and 32 in Figure 6.

Referring to Figures 7 to 10 inclusive it will be seen that I have devised another embodiment of the operating mechanism for the shaft and the drum. The numeral 35 denotes a bearing for disposal in one of the members 6, the inner end of the bearing having a horizontal bracket 36 which includes diverging arms terminating in end portions 37 for receiving bearing blocks 38 and 39.

The block 38 is pivotally mounted by screws 40 while the block 39 is held in place by thumb screws 41. A shaft 42 is journaled in the blocks 38 and 39 and has a worm 43 fixed thereon for swinging movement with the shaft into and out of mesh with a worm gear 44 on one of the shafts 10. Any suitable means may be engaged with the shaft 42 to turn the worm 43 and the worm gear 44 thereby rotating the respective shafts 10 so as to wind the cable on the drum as will be quite apparent.

To provide for quick adjustment the screws 41 may be unloosened so that the block 39 is free to be swung out of its respective end 37 causing the block 38 to pivot thereby unmeshing the worm from the worm gear so that the shaft 10 and parts connected thereto may be rotated quickly through hand manipulation of the worm gear 44.

It is thought that the construction, operation, utility and advantages of this invention will now be quite apparent to those skilled in this art without a more detailed description thereof.

The present embodiment of the invention has been disclosed in detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

A hoisting mechanism comprising in combination a pair of opposed stands, each of which comprises a body portion having bearing receiving members projecting laterally from one side thereof adjacent the upper and lower edges thereof, said bearing receiving members being arranged diagonally with respect to one another, a bearing for reception in a selected one of said bearing receiving members, and a rotatable element supported between said stands and having its ends journalled in said bearings, said rotatable member being longitudinally extensible whereby said stands may be placed the desired distance apart.

In testimony whereof I affix my signature.

LEONARD J. ARMSTRONG.